US006348129B1

(12) United States Patent
Colodette et al.

(10) Patent No.: US 6,348,129 B1
(45) Date of Patent: Feb. 19, 2002

(54) TREATMENT OF PULP MILL CONDENSATE WITH OZONE

(76) Inventors: Jorge Luiz Colodette, Bosque Acamari, 17, Vicosa (BR), 36570-000; Philippe Charlet, Avenida Atlantica 1998, Copacabana (BR), 22021-001

( * ) Notice: Subject to any disclaimer, the term of this patent is extended or adjusted under 35 U.S.C. 154(b) by 0 days.

(21) Appl. No.: 09/559,640

(22) Filed: Apr. 28, 2000

(51) Int. Cl.$^7$ .............................................. D21C 11/12
(52) U.S. Cl. ................ 162/30.11; 162/30.1; 162/29; 162/36; 162/51; 423/232; 423/233; 423/242; 423/245; 423/DIG. 3; 210/760; 210/631
(58) Field of Search ..................... 162/30.11, 30.1, 162/29, 36, 51; 423/232, 233, 242, 245, DIG. 3; 210/760, 631

(56) References Cited

U.S. PATENT DOCUMENTS

| 3,947,546 A | 3/1976 | Louise et al. ............... 423/242 |
| 4,115,258 A | 9/1978 | Smith et al. .................. 210/15 |
| 5,605,635 A | 2/1997 | David ......................... 210/750 |

FOREIGN PATENT DOCUMENTS

| CA | 2170553 | 11/1996 |
| WO | WO9318226 | 9/1993 |
| WO | WO9614464 | 5/1996 |

OTHER PUBLICATIONS

Karelin, Y.A. et al., "Use of Oxone In A Combined System For The Purification of Kraft Mill Effluents", Vodnye Resursy, No. 3: 137–140 (1975) (Abstract).
Burdarska, G., "Ozonization as the Third Stage of Effluent Purification", Tseluloza Khartiya 12, No. 4: 26–32 (1981) (Abstract).

*Primary Examiner*—Stanley S. Silverman
*Assistant Examiner*—Mark Halpern
(74) *Attorney, Agent, or Firm*—Donald T. Black

(57) ABSTRACT

An aqueous stream such as pulp mill condensate containing one or more sulfur compounds is treated by (a) reacting an aqueous feed stream containing TRS contaminant selected from the group consisting of hydrogen sulfide, methyl mercaptan, dimethyl sulfide, dimethyl disulfide, and mixtures thereof, with ozone to produce a first liquid product stream and a first gaseous product stream, wherein the total amount of said one or more contaminants in said first liquid product stream is less than 1% of the amount thereof in said feed stream, and wherein said first gaseous product stream contains ozone and one or more of said contaminants; and (b) treating said first gaseous product stream with an alkaline aqueous stream to remove essentially all of said one or more contaminants from said first gaseous product stream. Preferably, a second gaseous stream produced in step (b) and containing ozone is reacted with an aqueous stream containing one or more of said contaminants, to consume all the ozone in said stream.

12 Claims, No Drawings

TREATMENT OF PULP MILL CONDENSATE WITH OZONE

FIELD OF THE INVENTION

The present invention relates to processes using ozone to treat streams containing sulfur compounds.

BACKGROUND OF THE INVENTION

Part of the air pollution and most of the odor problems that occur in kraft pulp mills are caused by "total reduced sulfur" (TRS) compounds, which are formed during pulping by the reaction of hydrosulfide/sulfide ions with wood components. TRS compounds include one or more of hydrogen sulfide, methyl mercaptan, dimethyl sulfide and dimethyldisulfide. These compounds have a strong unpleasant odor at very low concentrations and are toxic at somewhat higher concentrations. They are released from the digesters, where wood is converted to pulp, and from the evaporators of the spent pulping liquor together with vapors and may also be found in the spent liquor itself. The vapors are condensed and the resulting condensates are aqueous waste streams that contain variable amounts of TRS. These condensates are aqueous streams which are also referred to as "contaminated condensate" or "foul condensate" depending on the level of their odor, their TRS concentration and/or their content of spent pulping liquor.

Due to their relatively high temperature, condensates are frequently used in the pulp mill e.g. for pulp washing and/or washing of lime applied in the recovery process of the pulping chemicals. Normally the condensates are treated to reduce their TRS content prior to their use. Condensate that is not utilized in the mill is collected together with other liquid discharges and is then treated biologically before release into a river or lake. TRS can escape from the condensates during re-use or during aeration in the biological treatment and can thus cause an odor problem unless its concentration has been reduced to a very low level.

The so called "Cluster Rules" promulgated in the United States by the Environmental Protection Agency (EPA) in 1998 limit the emission of TRS from pulp mills. For some mills, especially those with older equipment, meeting the Cluster Rule limits may be very challenging.

The TRS emission problem can be reduced by stripping the condensates with air or steam. The stripped gas is then incinerated to convert the sulfur of the TRS compounds to sulfur dioxide, for example in the mill's lime kiln, chemical recovery boiler or a stand-alone incinerator. In the latter case, the sulfur dioxide containing gas may be released into the atmosphere or may be scrubbed with a chemical solution that would then have to be disposed of. However, the stripper off-gas is a potential concentrated source of odor, and any mishap in handling this stream can create a very severe odor incident. Furthermore, the stripping efficiency may vary considerably depending on steam availability and pressure and the stripped condensate still contains some residual TRS, if the operating conditions are not optimized. However, under optimized conditions, steam stripping can remove almost 100% of the TRS. In contrast, air stripping is generally less efficient. In older mills, retrofitting of stripping equipment can be very expensive.

Biological treatment of effluents, both anaerobic and aerobic, is being developed to remove TRS and other organic compounds contained in the condensate. Anaerobic treatment requires considerable equipment, oxygen must be completely excluded and stringent process control is usually required due to the sensitive nature of aerobic microorganisms. Aerobic treatment requires aeration or addition of oxygen to the condensate. This mode of treatment can strip unoxidized TRS compounds into the off-gas unless special precautions are taken. Some bio-sludge has to be removed from both types of biological treatment.

Other methods proposed for TRS removal from condensates include:

activated carbon adsorption;

chemical oxidation with chlorine or oxygen;

chemical precipitation.

These three methods have not found application in the kraft pulp industry. Activated carbon adsorption and chemical precipitation generate a solid waste that needs to be further treated or perhaps disposed of in a special land-fill, while oxidation with chlorine is no longer environmentally acceptable. Oxidation with oxygen alone is of doubtful value, as shown herein.

BRIEF SUMMARY OF THE INVENTION

One aspect of the present invention is a process for treating an aqueous stream containing one or more reduced sulfur compounds, comprising:

(a) reacting an aqueous feed stream containing TRS contaminant selected from the group consisting of hydrogen sulfide, methyl mercaptan, dimethyl sulfide, dimethyl disulfide, and mixtures thereof, with ozone to produce a first liquid product stream and a first gaseous product stream, wherein the total amount of said one or more contaminants in said first liquid product stream is less than 1% of the amount thereof in said feed stream, and wherein said first gaseous product stream contains ozone and one or more of said contaminants; and (b) treating said first gaseous product stream with an alkaline aqueous stream to remove essentially all of said one or more contaminants from said first gaseous product stream.

Preferably, a second gaseous stream produced in step (b) and containing ozone is reacted with an aqueous stream containing one or more of said contaminants, to consume all the ozone in said stream.

DETAILED DESCRIPTION OF THE INVENTION

The present invention is applicable to all types of condensates produced in a pulp mill as long as they contain reduced forms of sulfur. These include (1) highly contaminated streams obtained from wood pulping and black liquor evaporation systems. These condensates come more specifically from the flash tanks of continuous digesters, blow tank relief valves of batch digesters, turpentine recovery systems, later stages of the evaporation system (known in the industry as effects 2 and 3) and the concentrator; (2) secondary condensates coming from the earlier stages of the evaporation system (known in the industry as effects 4 and 5); (3) condensates previously purified via air stripping; and (4) condensates previously purified via steam stripping. The concentration of TRS (total reduced sulfur) present in these various condensate streams may vary from 1 mg/L to 1500 mg/L and are treatable by the process of this invention. The stream being treated may also contain one or more of carbonyl sulfide, methanol, ethanol, acetone, furfural, and butanone.

The process is also applicable to contaminated condensates from other industrial operations as long they contain TRS concentrations within the range above specified.

The present invention achieves the destruction of TRS contained in condensates with ozone followed by scrubbing of the off-gas from the ozone treatment with an aqueous alkaline stream which can be a waste stream from the pulp mill. A large portion of the TRS can be oxidized with ozone, for example to sulfate, while a smaller amount of said contaminants is removed by being stripped into the oxygen rich off-gas. With a sufficiently high ozone dosage, TRS is removed so completely from the condensate that the amount of said contaminants remaining in the liquid stream produced in this step is less than 1%, preferably less than 0.5%, and more preferably less than 0.1% of the amount originally present in the stream fed to this step. At the same time, the color of condensates that are contaminated with small quantities of spent pulping liquor (so-called black liquor) decreases significantly; the pH of these contaminated condensates is reduced, from alkaline values typically about 9 or higher to 7.5 or less (preferably 7 or less) and their dissolved oxygen content rises significantly. Due to this quality improvement, the condensate may then be used in the mill without causing TRS emission problems.

The ozone used for condensate decontamination may be produced from an on-site generation system at concentrations ranging from 2–20% in the gas stream. However, the off-gas from an ozone bleaching system can also be directly applied in the decontamination of condensates. In addition, combinations of ozone with other oxidants and/or UV light could also be used. The impurities contained in this off-gas have little impact on the reaction of the leftover ozone with the sulfur compounds. The dosage of ozone applied will depend on the concentration of TRS present in the condensate. In general, the ozone doses will vary in the range from 10 to 1500 mg/L of condensate. The amount of ozone fed relative to the amount of said contaminants fed should be at least stoichiometric. Preferably, the ozone fed to the stream containing the contaminants should be in the ratio of at least 2:1, and more preferably at least 4:1, expressed as (moles of ozone):(moles of TRS contaminants as S).

The type of reactor that can be used to contact the ozone with the condensates may vary substantially. Column reactors are suitable but tubular and high-shear mixers can also be used. These reactors are well known to those skilled in the art and are available in the market from various equipment suppliers.

The operating conditions to react ozone with the condensates may vary substantially depending upon the type of condensates and pulp mill. Ideally, the reaction should take place at the temperature and pH of the condensate stream, to avoid the costs incurred with pH and temperature control of a large volume of condensate. In general, the range of pH at which the reaction of ozone with condensate should occur is in the range of 8–12 and the temperature is in the range of 40–90° C. The contact time between ozone and condensate will vary from 1–120 min depending upon the concentration of TRS present in the condensate.

The off-gas stream produced in this ozone treatment step contains 1–15 mg/L of the contaminants hydrogen sulfide, methyl mercaptan, dimethyl sulfide, and dimethyl disulfide. This stream is then fed to a second step where it is scrubbed with a dilute alkaline solution, to absorb the stripped TRS and any sulfur dioxide or trioxide formed by oxidation of TRS contained in the condensate. Examples of dilute alkaline solutions found suitable for scrubbing are alkaline bleach plant effluents from an extraction stage of the pulp mill or from a peroxide bleaching stage of the pulp mill. That is, peroxide compounds are an optional but preferred component of this stream. The residual peroxide from bleaching may further oxidize any stripped TRS or $SO_2$, thereby eliminating the residual peroxide, which can be environmentally harmful. The bleach plant effluent is then treated biologically in the normal manner together with other pulp mill effluents.

The alkaline solution that can be used to scrub any stripped TRS from the gaseous stream produced in the ozone/condensate reactor may include oxidized white liquor, sodium hydroxide or preferably alkaline bleach plant filtrate. Oxidized white liquor exists in pulp mills and is used in oxygen delignification processes. Sodium hydroxide solutions are used in alkaline extraction stages and alkaline bleach plant filtrates originate from hypochlorite beaching, conventional alkaline extractions, oxidative extractions with oxygen, oxidative extractions with peroxide, oxidative extractions with oxygen and peroxide, conventional peroxide stages and pressurized peroxide stages. The presence of residual peroxide and hypochlorite in these filtrates is favorable to eliminate in this stage any TRS contaminants stripped out from the ozone/condensate reactor in the first stage.

The concentration of alkali in these various alkaline solutions may vary substantially among the various sources. However, it is required that the pH of these solutions be in the range of 9–14 in order to scrub any fugitive TRS. The scrubbing of the off-gas stripped out from the ozone/condensate reactor with alkaline solution will take place at the temperature and pH of the alkaline stream used for such purpose. The pH of these streams should be in the range of 9–14 and the temperature in the range of 40–90° C. The alkali scrubbing of the stripped off-gas generally takes place in 1–120 min reaction time.

Alkaline solutions of pH 9–14 can also be used to neutralize the treated condensates from the first stage prior to piping them to the effluent treatment station.

The off-gas stream from this second step often contains residual ozone. It is preferred to contact this stream with condensate containing one or more of said reduced sulfur contaminants, either by carrying out contact in a third step in a suitable column or by recycling the off-gas stream to the condensate in the first step of the invention.

The technical advantages of the present invention include a very high oxidation potential, very rapid reaction, direct action on the TRS compounds, oxygen as end reaction and decomposition product, and complete absence of solid waste formation such as sludge. In addition, except for ozone, no fresh chemicals are needed.

The present invention presents special advantages when employed in connection to a pulp mill, because existing process streams generated by the conventional operations of the pulp mill can be employed without requiring any pre-treatment thereof.

The simplicity of the process is apparent from the examples listed below, which are all based on well controlled laboratory experiments and which were conducted with condensate samples from three different pulp mills, which are referred to herein as mills A, B and C.

In the laboratory, one or two liter condensate samples were treated with ozone in a vertical glass reactor (No. 1) equipped with an inlet pipe and sparger close to the bottom of the reactor, a magnetic mixer at the bottom end and an outlet pipe at the top end, at the temperature measured during sampling. The flow rate of the ozone was well controlled at the desired levels, the foam formed during the ozone treatment was collected in one or two 1-liter traps which were of similar design as the reactor, and the collapsed foam was mixed with the treated condensate immediately after the reaction. The first set of preliminary experiments was carried out with only one reactor (reactor 1) to evaluate ozone potential to reduce TRS. In the second set of experiments, the off-gas from the traps was scrubbed in two consecutive steps with water (reactor 2) and a dilute sodium hydroxide solution (reactor 3) to absorb TRS and/or sulfur trioxide that may be contained in the off-gas. These reactors were followed by another trap to collect any carry-over from the alkaline scrubber. In later experiments, the water scrubber (reactor 2) was eliminated and the fresh sodium hydroxide (reactor 3) was replaced with alkaline bleach effluent preheated to the temperature measured during sampling in the mill. Finally, the scrubbed gas was fed to a vertical plastic column filled with an aqueous solution of potassium iodide (KI) to react completely with the residual ozone or with iodine ($I_2$) at pH 5 to react with residual TRS, for analytical purposes. In all cases, sulfide contaminants denoted "TRS" contained one or more of hydrogen sulfide, methyl mercaptan, dimethyl sulfide, and/or dimethyl disulfide.

EXAMPLE 1a

A sample of a combined highly contaminated condensate from the continuous digester and the vaporators of integrated kraft pulp mill A was pre-heated to a temperature of 41° C. and then ozone dosages of 750 and 900 mg/L condensate were added to reactor 1 at a flow rate of 36 mg/min. The results are presented in the tabulation below.

|  | Original Condensate | $O_3$ dosage, 750 mg/L | $O_3$ dosage, 900 mg/L |
| --- | --- | --- | --- |
| TRS, mg/L expressed as Sulfur | 253 | 10.66 | 3.29 |
| $O_3$ consumption | — | 97.9 | 91.0 |
| % TRS reduction | — | 94.2 | 98.7 |

These results indicate that almost all ozone was consumed in the experiment and that a high reduction of TRS was achieved with the two ozone dosages applied. However, the residual TRS found in the treated condensate is still sufficiently high to cause olfactive nuisance. On the other hand, the significant TRS reduction observed may have been derived from a simple stripping action caused by the passage of the $O_3$ gas stream through the condensate. In the next examples these two aspects are addressed.

EXAMPLE 1

A sample of a combined contaminated condensate from the continuous digester and the evaporators of integrated kraft pulp and paper mill A was pre-heated to a temperature of 41° C. and then an ozone dosage of 250 mg/L condensate was added to reactor 1 at a flow rate of 36 mg/min. The results are presented in the tabulation below.

| Reactor Contents | Original Condensate | 1 Condensate | 2 Water | 3 Sodium Hydroxide Solution, initial pH 9 |
| --- | --- | --- | --- | --- |
| Sodium sulfate expressed as $SO_4^{2-}$, mg/L | 66 | 240 | 36 | 179.5 |
| pH | 8.9 | 8.5 | 7.9 | 7.8 |
| $COD^{(1)}$, mg/L | 3288 | 3082 | 106 | 77 |
| Color |  |  |  |  |
| mg PT/L | 337 | 194 | — | — |
| % Reduction | — | 42.4 | — | — |
| Odor | very strong | much reduced | Very little | none |

$^{(1)}$Chemical oxygen demand

The considerable increase of the sulfate concentration of the condensate after the treatment with ozone and the presence of sulfate in the water (reactor 2) and in the sodium hydroxide solution (reactor 3) indicates that ozone oxidized the sulfur compounds to sulfate and/or that some volatile sulfur compounds were carried by the reactor off-gas to the subsequent reactors where they were oxidized. The decrease in pH indicates the formation of acidic components. The small reduction of the chemical oxygen demand (COD) of the condensate and the presence of COD in reactors 2 and 3 shows that volatile organic compounds were stripped by the off-gas from reactor 1. The color and the odor of this particular condensate were reduced significantly by ozone. The combination of these effects indicates the beneficial action of the ozone treatment. All ozone was consumed in this experiment.

EXAMPLE 2 (COMPARATIVE)

A sample of contaminated combined condensate from the digester and the evaporators of mill A was treated with pure oxygen gas at a flow rate of 1500 mg/min for 15 minutes at an initial temperature of 40° C. with continuous agitation. The results were as follows.

| Reactor Contents | Original Condensate | 1 Condensate and Oxygen | 2 Water | 3 Sodium Hydroxide at pH 9, 0 |
| --- | --- | --- | --- | --- |
| TRS, mg/L expressed as Sulfur | 44.1 | 37.3 | 1.5 | 1.7 |
| PH | 9.1 | 9.1 | 8.8 | 9.0 |
| Odor | Strong | Strong | Very weak | Weak |

Only approximately 15% of the TRS was removed from the condensate, and most of this was absorbed jointly by the water and the weak sodium hydroxide solution. Approximately only 8% of the initial TRS of the condensate were not accounted for.

The pH of the condensate and of the sodium hydroxide solution remained unchanged, while that of the water increased, perhaps due to some mechanical carry-over of condensate with gas oxygen gas stream.

EXAMPLE 3 (COMPARATIVE)

A sample of combined contaminated condensate from mill B was treated with pure oxygen under the same conditions as described in Example 2, but the gas leaving the condensate was scrubbed in four reactors in sequence (with water and a dilute sodium hydroxide solution alternating) and finally was absorbed in an aqueous solution of iodine($I_2$) at pH 5 to react all residual TRS. The results of a chemical analysis indicated that almost 35% of the TRS were removed from the condensate by stripping with oxygen and that this stripped TRS was absorbed jointly by the various solutions contained in four reactors and by the iodine solution. In other words, all TRS of the original condensate could be accounted for as TRS. This conclusion indicates that no part of the TRS was oxidized by oxygen.

EXAMPLE 4

A sample of the contaminated condensate from the same source at mill A as used in Example 1 was treated in several experiments with ozone dosages of 100 to 250 mg/L (at an ozone flow rate of 33.8 mg/min). A dosage of 250 mg/L was necessary to completely remove the TRS from the condensate. Details of this particular experiment are tabulated below.

| Reactor Contents | Original Condensate | 1 Condensate | 2 Water | 3 Sodium Hydroxide at pH 9 |
|---|---|---|---|---|
| TRS, mg/L expressed as sulfur | 41.3 | 0 | 5.0 | 6.3 |
| pH | 9.0 | 7.9 | — | 7.8 |
| Dissolved oxygen content, mg/L | 0.7 | 38.9 | 40.9 | 38.6 |
| Color | | | | |
| mg PT/L | 362 | 190 | — | — |
| % Reduction | — | 47.5 | — | — |
| Ozone consumption, % | | 100 | — | — |

No TRS was found in the off-gas from reactor 3. This observation, the formation of sulfate reported in Example 1 and the presence of small quantities of TRS in the liquids of reactors 2 and 3 indicate that the complete removal of TRS from the condensate was a combination of oxidation by ozone and of stripping by the off-gas from reactor 1. The reduction of pH of the original condensate and of the sodium hydroxide solution from 9.0 to 7.9 and 7.8 respectively indicates that acidic compounds were formed by the reaction of ozone. The significant increase of the dissolved oxygen content of the condensate and the two scrub solutions in reactors 1 and 2 reflects the high oxygen content of the ozone gas.

EXAMPLE 5

A higher flow rate of ozone required a slightly higher ozone dosage (300 mg/L) to remove the TRS completely from an almost identical contaminated condensate as used in Example 4. With an ozone flow rate of 138 mg/min, the following results were obtained.

| Reactor Contents | Original Condensate | 1 Condensate | 2 Water | 3 Sodium Hydroxide at pH 9 |
|---|---|---|---|---|
| TRS, mg/L expressed as sulfur | 40.6 | 0 | 1.1 | 0.9 |
| pH | 9.1 | 7.7 | 7.3 | 7.2 |
| Dissolved oxygen content, mg/L | 0.5 | 28.0 | 39.2 | 42.8 |
| Ozone consumption, % | | 100 | — | — |

EXAMPLE 6

A contaminated condensate sample from mill A with an initial TRS content of 50.2 mg/L had to be treated with an ozone dosage of 575 mg/L at a flow rate of 138.7 mg ozone/L to remove all TRS. The results are presented in the table below.

| Reactor Contents | Original Condensate | 1 Condensate | 2 Water | 3 Sodium Hydroxide at pH 9 |
|---|---|---|---|---|
| TRS, mg/L expressed as sulfur | 50.2 | 0 | 1.9 | 3.9 |
| pH | 9.1 | 6.1 | 3.6 | 5.4 |
| Dissolved oxygen content, mg/L | 0.4 | 39.7 | 40.3 | 45.3 |
| Ozone consumption % | | 88 | — | — |

EXAMPLE 7

A sample of a combined condensate of mill B taken immediately ahead of a stripper integrated with the evaporators was heated to its original temperature of 62° C. and subsequently treated with an ozone dosage of 1250 mg/L at a flow of 74 mg/min. The results are tabulated below.

| Reactor Contents | Original Condensate | 1 Condensate | 2 Water | 3 Sodium Hydroxide at pH 9 |
|---|---|---|---|---|
| TRS, mg/L expressed as sulfur | 291.5 | 0 | 0 | 0.4 |
| pH | 8.2 | 3.9 | 3.6 | 4.1 |
| Dissolved oxygen content, mg/L | 0.4 | 33.6 | 41.3 | 43.2 |

The above data indicate that all TRS was completely destroyed except for the very small quantity absorbed by the sodium hydroxide solution (0.14% of the TRS of the original condensate) and that the pH of all liquids was reduced significantly. The low pH confirms that a strong acid was formed by the reaction of ozone.

EXAMPLE 8

Another sample from the same source at mill B as used in Example 7 was treated with ozone at a flow rate of 399 mg/min and a dosage of 2000 mg/L.

| Reactor Contents | — Original Condensate | 1 Condensate | 2 Water | 3 Sodium Hydroxide at pH 9 |
|---|---|---|---|---|
| TRS, mg/L expressed as sulfur | 228.6 | 0 | 1.3 | 0.6 |
| Sodium Sulfate, mg/L | 18.4 | 847.1 | 42.8 | 31.4 |
| pH | 8.2 | 3.8 | 2.9 | 2.8 |
| Dissolved oxygen content, mg/L | 0.5 | 30.5 | 38.8 | 43.2 |
| Ozone consumption, % | | 85.4 | | |

These results show complete removal of the TRS from the condensate, 99.2% destruction of the TRS and oxidation of 89% of the TRS to sulfate by the ozone. The low final pH values of the liquids are in agreement with the high level of sulfate formation.

EXAMPLE 9

A combined condensate sample from mill B with a very high TRS content was treated with an ozone dosage of 2250 mg/L at a flow rate of 608 mg/min and at a temperature of 64° C. The following results were obtained.

| Reactor | — | 1 | 2 | 3 |
|---|---|---|---|---|
| Contents | Original Condensate | Condensate | Water | Sodium Hydroxide at pH 9 |
| TRS, mg/L as sulfur | 424.0 | 1.5 | 0.8 | 2.3 |
| pH | 8.2 | 4.0 | 3.1 | 3.4 |
| Dissolved oxygen, mg/L | 0.4 | 31.9 | 40.3 | 41.3 |
| Ozone consumption, % | | 81.4 | | |

These results show 99.6% removal of the TRS from the condensate and 98.9% destruction of TRS.

EXAMPLE 10

A sample of a condensate with a very low TRS content taken at mill B after a steam stripper was treated with an ozone dosage of 800 mg/L at a flow rate of 153.6 mg/min. The results were as follows:

| Reactor | — | 1 | 2 | 3 |
|---|---|---|---|---|
| Contents | Original Condensate | Condensate | Water | Sodium Hydroxide at pH 9 |
| TRS, mg/L expressed as sulfur | 2.3 | 0.17 | 0 | 0 |
| pH | | 3.7 | 5.4 | 6.7 |
| Dissolved oxygen mg/L | | 30.9 | 41.7 | 35.5 |
| Ozone consumption, % | | 30.5 | | |

The data indicate that, even at the very low initial concentration of TRS, its removal efficiency was 92.6% at an ozone consumption of 244 mg/L.

EXAMPLE 11

An experiment similar to that described in Example 4 was conducted with a condensate with an initial TRS content of 138 mg/L taken at mill C immediately before stripping with air. An ozone dosage of 750 mg/L at a flow rate of 148 mg/min reduced the TRS content of this condensate to 0.6 mg/L; this corresponded to a removal efficiency of 99.6%. No TRS was found in a cold sodium hydroxide solution with an initial pH of 9.0 and in water, which served as a two stage scrubbing system for the off-gas from the ozone reaction. This observation indicates that the ozone oxidized almost all TRS of the condensate. By comparison, intense air stripping at the mill reduced the TRS content of this condensate only by 53%.

EXAMPLE 12

A condensate sample with an initial TRS content of 417.2 mg/L from mill B was treated with an ozone dosage of 2000 mg/L at a ozone flow rate of 147.4 mg/min and an initial temperature of 63° C. The gas was then scrubbed with an alkaline bleach plant effluent at an initial temperature of 55° C. The properties of this effluent are listed in the table below together with the results. The gas leaving the alkaline effluent was absorbed in water at ambient temperature to collect residual TRS if it existed.

| Reactor | — | — | 1 | 2 | 3 |
|---|---|---|---|---|---|
| Contents | Original Condensate | Alkaline Effluent | Condensate | Alkaline Effluent | Cold Water |
| TRS, mg/L | 417.2 | | 1.8 | 3.7 | 0 |
| pH | 9.1 | 11.4 | 5.5 | 9.7 | 3.2 |
| Dissolved oxygen, mg/L | 3.2 | 5.3 | 30.5 | 25.9 | 20.4 |
| Chemical oxygen demand, mg/L | — | 791 | — | 1324 | — |
| Color, mg Pt/L | — | 2416 | — | 490 | — |

The above results show that 99.6% of the TRS was removed from the condensate, 0.9% of the initial TRS of the condensate was absorbed by the alkaline bleach plant effluent and no TRS was found in the water. The liquids in all three reactors had a high dissolved oxygen content confirming that the gas passed through all of them. The pH of all liquids decreased indicating that volatile acidic material was generated by the ozone. The significant increase of the chemical oxygen demand and the color reduction of the alkaline bleach plant effluent measured after scrubbing of the gas from the condensate indicate that the residual ozone of this gas stream reacted with the organic components of this effluent.

In this experiment, 83% of the ozone was consumed. In a later example, the use of the residual ozone is demonstrated.

EXAMPLE 13

Another condensate sample taken at mill C before the stripper was treated with an ozone dosage of 1000 mg/L at an ozone flow rate of 147.4 mg/min. The gas leaving this treatment was first scrubbed with a sample of an alkaline bleach plant effluent (reactor 2) and subsequently fed into a fresh sample of condensate (reactor 3). The results presented below show that no TRS was detected in the alkaline bleach plant effluent and also that all TRS was removed from the fresh condensate placed in reactor 3.

| Reactor | — | 1 | 2 | 3 |
|---|---|---|---|---|
| Contents | Original Condensate | Condensate | Alkali Effluent | Sodium |
| TRS, mg/L as sulfur | 104.0 | 0.7 | 0 | 0 |
| pH | 9.0 | 4.9 | 3.2 | 3.5 |

EXAMPLE 14

Two samples of condensate taken at mill C after stripping with air were treated with ozone dosages of 750 mg/L at an ozone flow rate of 148.8 mg/min in two parallel experiments. The off-gas from the ozone reaction was first scrubbed with alkaline bleach plant effluent (reactor 2) and then with fresh condensate (reactor 3). Finally, in one of the two experiments (A) the gas from the condensate placed in reactor 3 was absorbed in an aqueous solution of iodine to determine the residual TRS content of the gas if any was present. The same type of gas of the other experiment (B) was absorbed in an aqueous solution of potassium iodide to determine the residual ozone content of the gas. The results are presented in the table below.

| | Experiment A: | | |
|---|---|---|---|
| Reactor no. | Contents | TRS, mg/L | pH |
| — | Original condensate | 45.5 | 9.6 |
| — | Alkaline Bleach Plant Effluent | 0 | 11.5 |
| 1 | Condensate | 5.8 | 8.4 |
| 2 | Alkaline Effluent | 4.4 | 11.4 |
| 3 | Condensate | 4.9 | 8.5 |
| 4 | Iodine | 0 | — |

| | Experiment B | | |
|---|---|---|---|
| Reactor no. | Contents | TRS, mg/L | pH |
| — | Original Condensate | 36.8 | 4.0 |
| — | Alkaline Effluent | 0 | 11.5 |

| | Experiment B | | |
|---|---|---|---|
| Reactor no. | Contents | TRS, mg/L | pH |
| 1 | Condensate | 4.2 | 8.5 |
| 2 | Alkaline Effluent | 4.3 | 11.2 |
| 3 | Condensate | 4.3 | 8.5 |
| 4 | Potassium Iodide | 0 | — |

Ozone consumed: 94.4 %

Due to the relatively low ozone dosage chosen, the removal of TRS from the original condensate placed in reactor 1 was only 87.2% and 88.6% respectively in the two experiments. The quantity of TRS absorbed by the alkaline effluent was 11% to 13% of the original TRS of the condensate, while the TRS content of the condensate placed in reactor 3 was reduced 88% to 89% by the off-gas from reactor 2. This gas did not contain TRS, while the overall ozone consumption was 94.4% of the quantities added at reactor 1. These results not only confirm that the alkaline effluent is a suitable scrubbing medium for the off-gas from the ozone treatment of the condensate, but they also show that the residual ozone can be utilized to treat condensate.

EXAMPLE 15

A combined condensate sample taken at mill C before the stripper was treated with an ozone dosage of 1200 mg/L at an ozone flow rate of 148 mg/min and at an initial temperature of 56° C. The off-gas from this treatment was first scrubbed with an alkaline bleach plant effluent at a temperature of 50° C. and then by fresh combined condensate. Finally, the off-gas from this last condensate treatment was absorbed in an aqueous solution of iodine to react with any residual TRS that might be present. (Analytical determination of the iodine consumption permits calculation of the quantity of TRS in the off-gas).

The results obtained are reported below.

| Reactor | — | — | 1 | 2 | 3 | 4 |
|---|---|---|---|---|---|---|
| Contents | Original Condensate | Alkaline Effluent | Condensate | Alkaline Effluent | Condensate | Iodine |
| TRS, mg/L | 100.1 | 0 | 0.8 | 7.1 | 4.8 | 0 |
| pH | 9.1 | 11.5 | 4.5 | 10.6 | 7.3 | — |
| Chemical oxygen Demand, mg/L | 5557 | 1005 | 5279 | 948 | 5187 | — |
| Color, mg Pt/L | 48 | 3235 | 14 | 935 | 48 | — |

Under the conditions chosen,
- 99.2% of the TRS contained in the condensate fed to reactor 1 was removed by the ozone,
- 7.1% of the TRS of the above condensate was absorbed by the alkaline bleach plant effluent,
- 95.2% of the TRS of the condensate placed in reactor 3 was removed by the off-gas from the alkaline bleach plant effluent,
- no TRS was present in the final gas leaving reactor 3,
- the pH value of the condensate placed in reactor 1 was reduced significantly and would have to be increased with alkali before re-use or sewering of the treated condensate, the pH reduction of the alkaline effluent is desirable because somewhat less acidic material would be required for neutralization prior to sewering, the final pH of the condensate placed in reactor 3 would be ideal for re-use or sewering of the condensate, the reduction of the chemical oxygen demand of the condensate and the alkaline effluent was only 5% to 7% (insignificant), the color of the condensate placed in reactor 1 and of the alkaline effluent (reactor 2) was reduced 71%, while the absolute color reduction of the condensate color was small (34 mg Pt/L) due to its low initial color; the color reduction of the alkaline effluent (which usually is responsible for much of the combined mill effluent color) was quite significant (2300 mg Pt/L).

From the examples, it can be seen that the quantity of ozone required to remove the TRS either completely or almost completely from the condensate depends mainly on the initial concentration of the TRS and to some extent also on the ozone flow rate. Usually, at a lower flow rate, the required ozone dosage for a given condensate tended to be somewhat lower than at a higher flow rate, under the experimental conditions and with the specific equipment used in the examples. In the examples given above, the ozone dosages reported are a result of experiments in which the ozone dosage was increased from one experiment to the next until all or almost all TRS was removed from the condensate. All other parameters were usually kept constant.

Preferred embodiments of the present invention exhibit at least one of the following characteristics:

application of sufficient ozone to the condensate placed in reactor 1 to remove at least 99%, preferably at least 99.5% and more preferably at least 99.9% of the TRS ("removal" meaning the combined effect of chemical reaction with ozone in the first step plus some TRS being carried out in the off-gas from this step); temperature of 40–90° C., preferably 50° C.; pH of 8–10, preferably 9; residence time of 1–120 min, preferably 5 min; ozone dosage 2–8, preferably 3, mmol ozone/mmol TRS as sulfur.

scrubbing of the off-gas from reactor 1 with an alkaline waste stream from the pulp mill (in reactor 2) to absorb TRS stripped from reactor 1 as well as sulfur dioxide or trioxide that was formed by the oxidation of TRS and may have been volatilized from reactor 1; temperature of 40–90° C., preferably 50° C.; pH of the alkaline stream greater than 9; residence time 1–120 min, preferably 2 min absorption of the off-gas from reactor 2 by fresh condensate placed in reactor 3 to completely react the residual ozone and to destroy some TRS of this condensate, adjustment of the ozone dosage added at reactor 1, not only to achieve complete consumption of ozone but also at the same time, to obtain a final off-gas free of or very low in TRS from reactor 3; to achieve this latter goal, an adjustment of the volume of the condensate placed in reactor 3 may be necessary, recycling of the condensate treated in reactor 3 if its residual TRS is unacceptably high, to reactor 1 for further treatment with ozone together with fresh condensate.

An alternative method of this invention is the possibility of collecting fugitive gaseous sources of TRS from various parts of the pulp mill and scrubbing them with water. The solution containing TRS is then treated with ozone using the process of this invention. This concept is applicable also to fugitive emissions from manufacturing processes other than pulp and paper, including petrochemical and steel industries, wastewater treatment stations or wherever there would be TRS air emissions.

What is claimed is:

1. A process for treating an aqueous stream containing one or more sulfur compounds, comprising:

(a) reacting an aqueous feed stream containing TRS contaminant selected from the group consisting of hydrogen sulfide, methyl mercaptan, dimethyl sulfide, dimethyl disulfide, and mixtures thereof, with ozone to produce a first liquid product stream and a first gaseous product stream, wherein the total amount of said one or more contaminants in said first liquid product stream is less than 1% of the amount thereof in said feed stream, and wherein said first gaseous product stream contains ozone and one or more of said contaminants; and (b) treating said first gaseous product stream with an alkaline aqueous stream to remove all of said one or more contaminants from said first gaseous product stream.

2. A process according to claim 1 wherein the concentration of said TRS contaminant in said aqueous feed stream is 1–1500 mg/L.

3. A process according to claim 1 wherein the amount of TRS contaminant in said first liquid product stream is less than 1% of the amount of TRS contaminant in said aqueous feed stream.

4. A process according to claim 1 wherein the amount of TRS contaminant in said first liquid product stream is less than 0.1% of the amount of TRS contaminant in said aqueous feed stream.

5. A process according to claim 1 wherein said first gaseous product stream contains 1–15 mg/L of TRS contaminant.

6. A process according to claim 1 wherein the pH of said aqueous feed stream is at least 9 and the pH of said first liquid product stream is 7.5 or less.

7. A process according to claim 1 wherein step (b) produces a second gaseous product stream which contains ozone and wherein said second gaseous product stream is reacted with an aqueous stream containing one or more of said contaminants, to consume all the ozone in said second gaseous product stream.

8. A process according to claim 7 wherein the concentration of said TRS contaminant in said aqueous feed stream is 1–1500 mg/L.

9. A process according to claim 7 wherein the amount of TRS contaminant in said first liquid product stream is less than 1% of the amount of TRS contaminant in said aqueous feed stream.

10. A process according to claim 7 wherein the amount of TRS contaminant in said first liquid product stream is less than 0.1% of the amount of TRS contaminant in said aqueous feed stream.

11. A process according to claim 7 wherein said first gaseous product stream contains 1–15 mg/L of TRS contaminant.

12. A process according to claim 7 wherein the pH of said aqueous feed stream is at least 9 and the pH of said first liquid product stream is 7.5 or less.

* * * * *

UNITED STATES PATENT AND TRADEMARK OFFICE
CERTIFICATE OF CORRECTION

| | | |
|---|---|---|
| PATENT NO. | : 6,348,129 B1 | Page 1 of 1 |
| DATED | : February 19, 2002 | |
| INVENTOR(S) | : Jorge Luiz Colodette and Philippe Charlet | |

It is certified that error appears in the above-identified patent and that said Letters Patent is hereby corrected as shown below:

<u>Title page</u>,
Change "[76]" to -- [75] --, and immediately thereunder insert the following:

-- [73] Assignee: Praxair Technology, Inc.
                        Danbury, CT --

Signed and Sealed this

Twenty-third Day of April, 2002

*Attest:*

JAMES E. ROGAN
*Attesting Officer*     *Director of the United States Patent and Trademark Office*